US008383933B2

(12) United States Patent
Mogensen et al.

(10) Patent No.: US 8,383,933 B2
(45) Date of Patent: Feb. 26, 2013

(54) EARTHING SYSTEM FOR A WIND TURBINE CONNECTED TO A UTILITY GRID AND FOR A WIND TURBINE PARK

(75) Inventors: Niels Birch Mogensen, Viborg (DK); Kim Bertelsen, Ulfborg (DK)

(73) Assignee: Vestas Wind Systems A/S, Aahrus N (DK)

(*) Notice: Subject to any disclaimer, the term of this patent is extended or adjusted under 35 U.S.C. 154(b) by 729 days.

(21) Appl. No.: 12/302,247

(22) PCT Filed: Oct. 9, 2006

(86) PCT No.: PCT/DK2006/000568
§ 371 (c)(1),
(2), (4) Date: Nov. 24, 2008

(87) PCT Pub. No.: WO2007/134599
PCT Pub. Date: Nov. 29, 2007

(65) Prior Publication Data
US 2009/0272557 A1  Nov. 5, 2009

(30) Foreign Application Priority Data

May 24, 2006 (DK) ................................ 2006 00718
Sep. 21, 2006 (DK) ................................ 2006 01218

(51) Int. Cl.
*H02G 13/00* (2006.01)
*F03D 9/00* (2006.01)
(52) U.S. Cl. ............................................ 174/2; 290/44

(58) Field of Classification Search .................. 174/2, 6; 416/146 R, 197 A; 290/7, 43, 44
See application file for complete search history.

(56) References Cited

U.S. PATENT DOCUMENTS

| 4,890,189 | A  | * | 12/1989 | Genevieve | ................. | 361/222 |
| 6,177,630 | B1 | * | 1/2001  | Stensgaard | .................. | 174/2 |
| 6,455,777 | B1 | * | 9/2002  | Laukhuf | ................. | 174/68.3 |
| 2005/0230980 | A1 | * | 10/2005 | Brunet | ............................. | 290/44 |

FOREIGN PATENT DOCUMENTS

| EP | 1 036 937    | 9/2000  |
| JP | 2002 320319  | 10/2002 |
| JP | 2004 225660  | 8/2004  |
| JP | 2005 302399  | 10/2005 |

OTHER PUBLICATIONS

IEEE, Standard—1094, 1991, IEEE, pp. 7-30.*
International Search Report; PCT/DK2006/000568; Feb. 22, 2007.

(Continued)

*Primary Examiner* — Thomas L Dickey
*Assistant Examiner* — Nikolay Yushin
(74) *Attorney, Agent, or Firm* — Patterson & Sheridan, LLP (57) ABSTRACT

The invention relates to an earthing system for a wind turbine connected to a utility grid. The wind turbine comprises at least one electric system such as low or high voltage power systems and cables (16), at least one control system such as a SCADA system and control cables (18), and/or at least one safety system such as a lightning protection system, wherein a connection to an electrically earth potential is established from one defined place (12) within the wind turbine for said systems.

25 Claims, 9 Drawing Sheets

OTHER PUBLICATIONS

McNiff, B.: "Wind turbine lightning protection project: 1999-2001" National Renewable Energy Laboratory, [online] May 2002, XP002419155 US Department of Energy; Retrieved from the Internet: URL:http://www.osti.gov/energycitation/servlets/purl/15000382-BDX1oN/native/>[retrieved on Feb. 8, 2007] p. 27-p. 52.

Jenkins N. et al: "Earthing of wind farms" Renewable Energy—Clean Power 2001, 1993, International Conference on London, UK, London, UK, IEE, UK, 1993, pp., 190-195, XP006513374; ISBN: 0-85296-605-9 p. 190, col. 1, paragraph 2-col. 2, paragraph 1; p. 191, col. 1, paragraph 1-col. 2, paragraph 2.

* cited by examiner

EARTHING SYSTEM FOR A WIND TURBINE CONNECTED TO A UTILITY GRID AND FOR A WIND TURBINE PARK

BACKGROUND OF THE INVENTION

The invention relates to a wind turbine connected to a utility grid and a wind turbine park.

DESCRIPTION OF THE RELATED ART

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front as illustrated on FIG. 1.

Overvoltage caused by a fault situation such as a short circuit, lightening strike or other can be potentially very damaging for the wind turbine, possible personnel operating it or at least it can reduce the quality of the power produced. It is therefore known to provide the wind turbine with some sort of earthing system.

In U.S. Pat. No. 6,932,574 B2 is shown a wind turbine comprising a lightning protection system and a system for continuously discharging of electrostatic charges of the wind turbine blades. The lightning protection and the electrostatic discharging are done by connecting the systems to earth by means of the wind turbine foundation and earth electrodes extending vertical into the ground.

The problem with this type of earthing system is that the quality and the stability of the earth connection can be difficult to maintain, in that it can be difficult to ensure that all parts of the wind turbine is securely grounded at all times and that no potentially damaging or dangerous electrical potential differences occur inside or around the wind turbine.

The object of the invention is therefore to provide for a secure earthing system without the above mentioned disadvantages

THE INVENTION

The invention provides for a wind turbine connected to a utility grid. The wind turbine comprises at least one electric system such as low or high voltage power systems and cables, at least one control system such as a SCADA system and control cables, and/or at least one safety system such as a lightning protection system, wherein a connection to an electrically earth potential is established from one defined place within the wind turbine for said systems.

Modern large wind turbines require earthing for many different things. First of all the lightning protection systems requires a good earth connection to prevent a lightening strike from damaging the wind turbine or the surroundings and substantially all other electrical components in the wind turbine do also need secure earthing. Traditionally these systems have been grounded in different ways in different places in the wind turbine.

By connecting the systems to an earthing system at one defined place inside the wind turbine it is possible to obtain a secure and efficient earth connection equalizing the electrical potentials between different systems, different parts of the wind turbine and the surrounding ground. This is advantageous, in that potentially dangerous and/or damaging potential differences between different earthing systems and/or different part of the wind turbine and/or the area surrounding the wind turbine are avoided or severely reduced.

In an aspect of the invention, said one defined place includes a rail in an electrically conductive material with connection means for said systems e.g. connection holes and loops for establishing connection between the rail and cable screens of said systems.

Using a rail made of an electrically conductive material to establish the one defined place is advantageous, in that a rail is a simple, inexpensive and at the same time efficient mean for joining all the cables etc. that needs earthing.

In an aspect of the invention, said rail material is stainless steel.

It is advantageous the make the rail of stainless steel, in that this is a very durable material with good electrical conducting qualities. Furthermore, by making the rail of stainless steel the risk of galvanic corrosion is avoided or at least severely reduced.

In an aspect of the invention, said one defined place is the single point of entry (SPE) into the wind turbine for power cables, control conductor and the like.

Establishing the one defined place at the place where all power cables, control conductor, lightening protection cables etc. enters or exits the wind turbine is advantageous, in that it hereby in a simple way is possible to ensure that before these wires or cables are connected to their destination in or outside the wind turbine they will be connected to ground. Hereby the risk of dangerous or damaging electrical potential differences in or around the wind turbine is avoided or further reduced.

In an aspect of the invention, said one defined place is positioned within the foundation section e.g. just above the ground floor.

By establishing the one defined place just above the ground floor inside the wind turbine tower it is possible to earth all cables, wires, components etc. immediately after they enter or just before they leave the wind turbine—typically through conduit embedded in the foundation.

In an aspect of the invention, said one defined place is positioned within a tubular tower ring e.g. inside the first tower ring with connections to the inside of the ring.

Hereby is achieved an advantageous embodiment of the invention.

In an aspect of the invention, said one defined place is positioned within a lattice tower e.g. with connections to different steel profiles of the tower.

Hereby is achieved an advantageous embodiment of the invention.

In an aspect of the invention, the connected parts of said systems to the defined place are the screens of the power cables, the screens of the control cables, the down conductor of the lightning protection systems and/or the screen of fibre optic cables.

It is advantageous to connect all wire and cable screens, the down conductor of the lightning protection systems and other things needing earthing to the one defined place in the wind turbine tower, in that it hereby is ensured that all electric conducting elements entering or leaving the wind turbine are equalized to the earth potential in a safe and secure manner.

In an aspect of the invention, the defined place further is connected to an earthing system, said earthing system being embedded partly or totally in the wind turbine foundation.

Since the foundation of the wind turbine is situated directly under the wind turbine and the foundation provides for a controlled and predictable environment, it is advantageous to embed the earthing system partly or totally in the foundation.

In an aspect of the invention, said earthing system comprises one or more electric conducting means extending radial from said wind turbine into the ground e.g. said means being two conductors with a length between approx. 30 and 50 meters extending in substantially opposite directions.

It is advantageous to make the earthing system comprise conductors extending radial from the wind turbine in the ground in that, hereby a good and secure earthing connection is established.

Furthermore, it is advantageous that the conductors extends radial in the ground, in that e.g. compared to vertical earth rods, substantially horizontal earth conductors are easier to install in the ground, and it is possible to install then in the same cable trenches as used by the main power cables or other cables. This enables that no or little extra digging is needed to install horizontal earth conductors.

Additionally, when the earth conductors are installed in the same cable trenches as the other cables entering or exiting the wind turbine, the earth conductors will also function as lightning protection of the other cables in the ground.

In an aspect of the invention, said earthing system comprises two electric conducting means extending radial from said wind turbine into the ground in a mutual angle of no less than 80 degrees in a horizontal plane.

E.g. in a lightening protection system only approximately the first 40 meters of the electric conducting means running in the ground will be efficient toward conducting the high frequent lightening. It is therefore advantageous to provide the earthing system with two electric conducting means running in substantially opposite directions or at least forming an intermediate angle in a horizontal plane of no less than 80 degrees, to ensure that the electric conducting means covers as large an area as possible, to ensure that the efficiency of the earthing system is not reduced from the electric conducting means being placed to close.

In an aspect of the invention, one end of at least one of said electric conducting means are connected to the earthing system of a substation, the earthing system of a neighbouring wind turbine, the earthing system of a transformation plant of a utility grid or the earthing system of a high-voltage cable of a utility grid.

This is advantageous, in that it hereby is possible to equalize the electrical potential of the wind turbine against the earth connection of any electrical equipment to which e.g. the main power cables of the wind turbine is connected.

In an aspect of the invention, said earthing system comprises a foundation earthing including at least one earthing wire embedded in said foundation.

The foundation for a large modern wind turbine is usually reinforced by metal bars or nets with excellent electrical conducting qualities, and since the foundation is very large and the surface of the foundation in contact with the surrounding soil therefore also is very large, it is advantageous to embed an earthing wire in the foundation.

In an aspect of the invention, said at least one earthing wire comprises means for electrically connection to metal reinforcement in said foundation.

By connecting the earthing wire to the reinforcement in the foundation it is possible to establish a large, secure and efficient earth connection in a simple and inexpensive way.

In an aspect of the invention, said electric conducting means and/or said earthing wire are bare stranded cobber wires.

Cobber is an excellent conductor of electricity besides being a relatively durable and inactive material and bare stranded wires has a large capacity and surface making this type of cable particularly suited for being concreted into a wind turbine foundation or dug into the ground to form an earth connection.

In an aspect of the invention, said earthing system comprises one or more metal foundation support structures enclosing said wind turbine foundation and/or embedded in wind turbine foundation.

Certain foundation types such as pier foundations comprise metal support structures in the form of pipe or box shells made from metal plates, which e.g. are corrugated. This support structure is relatively large and covers a lot of ground beneath the wind turbine which is advantageous, in that hereby a good and secure earthing connection is established.

The invention further provides for a wind turbine connected to a utility grid. The wind turbine comprises at least two electric systems such as a lightning protection system and a low or high voltage power system, an electrically earth potential established by at least one foundation earthing including at least one earthing wire embedded partly or totally in the wind turbine foundation, and at least one electric conducting means extending radial from said wind turbine into the ground, wherein a connection to said electrically earth potential is established from one defined place within the wind turbine for said systems.

Using the wind turbine foundation is a simple, secure and efficient way to establish an earth connection and by supplementing this by means of electric conducting means extending substantially horizontally from said wind turbine in the ground a particularly secure and efficient earth connection is established, which is distributed over a large area surrounding the wind turbine.

By bringing the different earthing systems together in one defined place in the wind turbine it is possible to make a efficient and secure connection to the electric systems, hereby eliminating or reducing the risk of dangerous or damaging potential differences occurring in the or around the wind turbine.

In an aspect of the invention, said one defined place includes a rail in an electrically conductive material with connection means for said systems e.g. connection holes and loops for establishing connection between the rail and cable screens of said systems.

In an aspect of the invention, said rail material is stainless steel.

In an aspect of the invention, the defined place further is connected to an earthing system, said earthing system being embedded partly or totally in the wind turbine foundation.

In an aspect of the invention, said earthing system comprises one or more electric conducting means extending radial from said wind turbine into the ground e.g. said means being two conductors with a length between approx. 30 and 50 meters extending in substantially opposite directions.

In an aspect of the invention, said earthing system comprises two electric conducting means extending radial from said wind turbine into the ground in a mutual angle of no less than 80 degrees in a horizontal plane.

In an aspect of the invention, one end of at least one of said electric conducting means are connected to the earthing system of a substation, the earthing system of a neighbouring wind turbine, the earthing system of a transformation plant of a utility grid or the earthing system of a high-voltage cable of a utility grid.

Even further the invention provides for a wind turbine park comprising at least two wind turbines according to any of claims 1 to 23.

Using wind turbines where the electric systems and other are connected to the earthing systems in one defined place inside the wind turbines to form a wind turbine park are advantageous, in that the efficiency of the individual wind turbines in a park are dependent of the efficiency of the other wind turbines in the park. If all the wind turbines are provided with earthing systems and connections to the earthing system according to the invention, the risk of breakdowns in individual wind turbines are reduced, hence the overall efficiency of the entire park is increased.

In an aspect of the invention, said at least two wind turbines are interconnected by means of earthing systems of said wind turbines.

By interconnecting the wind turbines any potential differences between the individual wind turbines in the park can be equalized. This is advantageous, in that electrical potential differences between the wind turbines can potentially be damaging particularly to the electrical equipment in the wind turbines and dangerous to personnel operating or servicing the wind turbines.

In an aspect of the invention, said earthing systems comprise one or more electric conducting means extending radial from said wind turbines into the ground, said electric conducting means being interconnected hereby forming one or more earth interconnection wires.

The electric conducting means do by nature have excellent electricity conducting qualities and by connecting these electric conducting means from the individual wind turbines to make them form interconnection wires, no other electrical potential equalizing means between the wind turbines are needed. Hereby is established efficient and inexpensive means for equalizing electrical potential differences between the wind turbines.

FIGURES

The invention will be described in the following with reference to the figures in which.

DETAILED DESCRIPTION

Figure 1:
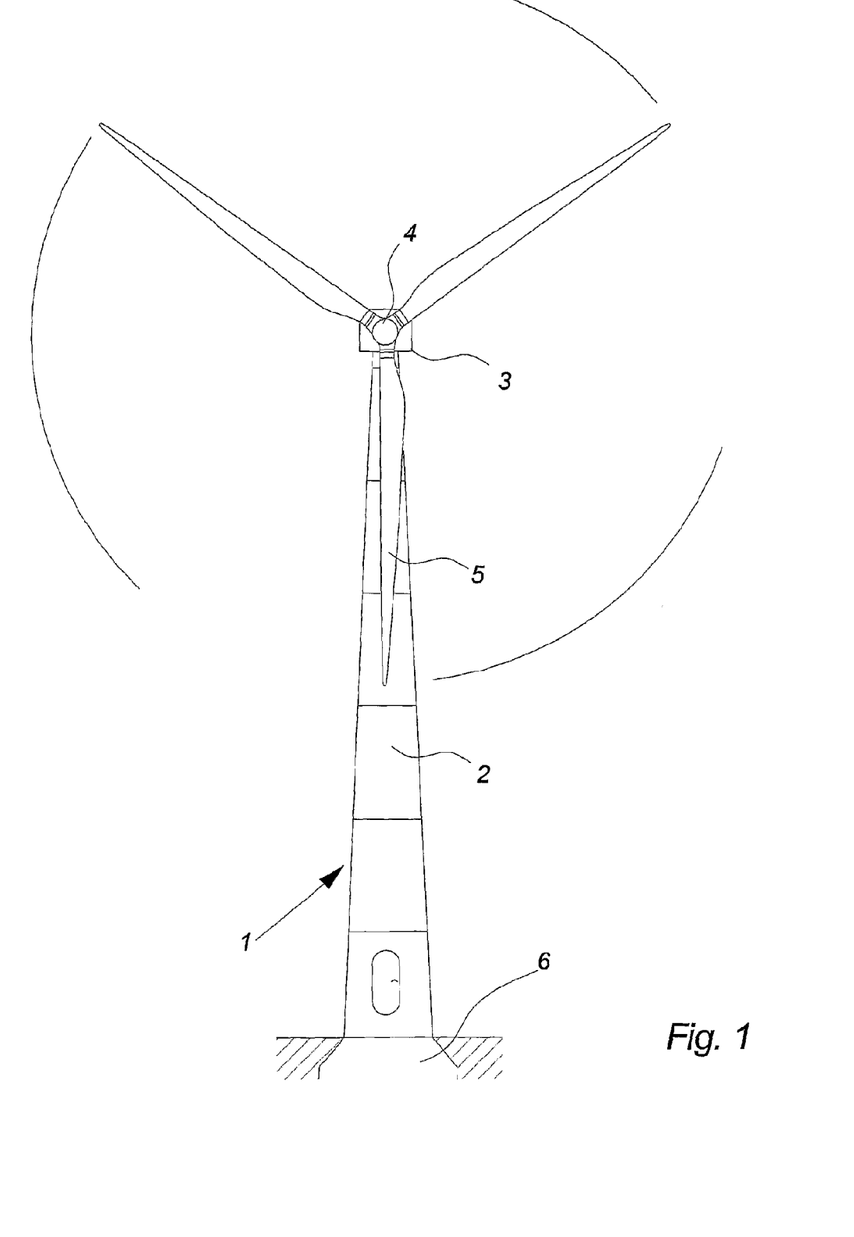
FIG. 1 illustrates a large modern wind turbine known in the art, as seen from the front.

FIG. 1 illustrates a modern wind turbine 1, comprising a tower 2 placed on a foundation 6 and a wind turbine nacelle 3 positioned on top of the tower 2. The wind turbine rotor 4, comprising three wind turbine blades 5, is connected to the nacelle 3 through the low speed shaft 6 which extends out of the nacelle 3 front.

Figure 2:
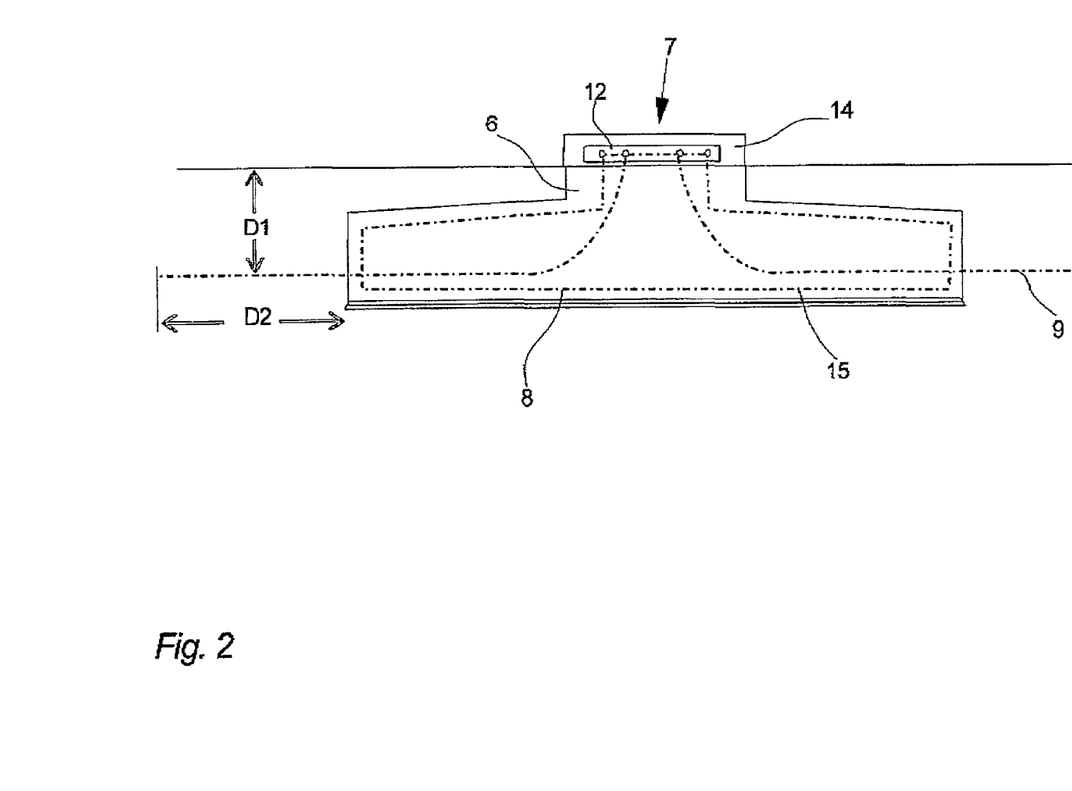
FIG. 2 illustrates a cross section of a wind turbine foundation comprising an earthing system, as seen from the side.

FIG. 2 illustrates a cross section of a wind turbine foundation comprising an earthing system 7, as seen from the side.

In this embodiment of the invention the earthing system 7 comprise at least two different independent systems 8, 9, 11 establishing an electrically earth potential for the wind turbine 1. The at least two different independent systems 8, 9, 11 being connected to one single rail 12 at one defined place in the wind turbine 1. The first system is the foundation earthing 8 itself and the second is two electric conducting means 9 extending radial from the wind turbine 1 into the ground.

In this preferred embodiment the second system comprise two wires 9 each extending min. 40 meters D2 from the foundation in opposite directions, where the end furthest away from the wind turbine 1 on one of the wires 9 would be connected to the earthing system of a neighbouring substation 21. But in another embodiment the system could comprise another number of wires 9 such as one, three, four, five or more.

In a preferred embodiment at least one of the wires 9 would always follow the wind turbines main power cable or cables 16 to its origin, which e.g. could be one or more neighbouring wind turbines 1 or a substation 21 in a wind turbine park 10 or it could be a transformer plant or a high-voltage power cable of the utility grid. Hereby the wires 9 could also function as lightening protection means for the main power cables 16 through their entire path in the ground.

In this embodiment the two wires 9 are positioned symmetrically around the wind turbine, making the angle between the wires 9 180 degrees, but in another embodiment the wires 9 could be placed asymmetrically. In a preferred embodiment there would be at least in an angle of minimum 90 degrees between the wires 9.

In this embodiment the wires 9 extend in a straight line radial from the foundation 6, but in another embodiment the wires 9 could be curved or bend e.g. to pass obstacles such as rocks. Furthermore, in this embodiment the ground surrounding the wind turbine is flat, hence the wires 9 extend horizontally if they—as shown—are buried at a constant depth D1. If the surrounding terrain was undulating or if the wind turbine was sited on a hillside the wires 9 would still extend radial from the wind turbine 1 but the wires 9 would not be horizontal but instead in an angle or curved.

The electric conducting means 9 in the system 7 does in this preferred embodiment consist of bare 50 mm$^2$ stranded copper wires to reduce or eliminate the risk of galvanic corrosion, but in another embodiment they could be made of another electrically conducting material such as steel, stainless steel, aluminium, silver or other, and the sectional area or the wires 9 could of cause be both smaller or larger than 50 mm$^2$ depending on the quality of the soil, the size and output of the wind turbine 1 and a lot of other factors. All connections in the system are doubled.

A third earthing system 7 is possible if the wind turbine 1 was part or a wind turbine park 10 comprising at least two wind turbines. Then the electric conducting means 9 of a first wind turbine 1 could be connected to the electric conducting means 9 of a second wind turbine 1. In this embodiment only the first 40 meters of these earth interconnection wires 11 between the wind turbines 1 are included in the earthing system 7 provided by the electric conducting means 9 in relation to the lightening protection system, as only the first 40 meters of bare wire 9 is positively contributing to the earthing system, in relations to high frequency lightning currents running in the system. This point of view would be relevant in relation to lightning protection and EMC.

In this embodiment all parts in the earthing system 7 are neutral (same galvanic potential) to each other in relation to galvanic corrosion. This way no galvanic corrosion is possible in the earthing system 7.

All earthing connections and down conductors are connected to a rail 12 in form of a main earth bonding bar at the bottom of the tower 2. All incoming cables (cable screens) are also connected to the main earth bonding bar. This is described more detailed under FIGS. 5, 6 and 7.

In this embodiment the rail 12 is formed as one single straight bar but in another embodiment of the invention the rail could be curved and its cross section could be made in several different shapes such as square, rectangular, round, polygonal or other.

In this embodiment of the invention the rail 12 is made of stainless steel for among other reasons to eliminate the risk of galvanic corrosion, but in another embodiment the rail 12 could be made of cobber, steel, aluminium, silver or other.

Figure 3:
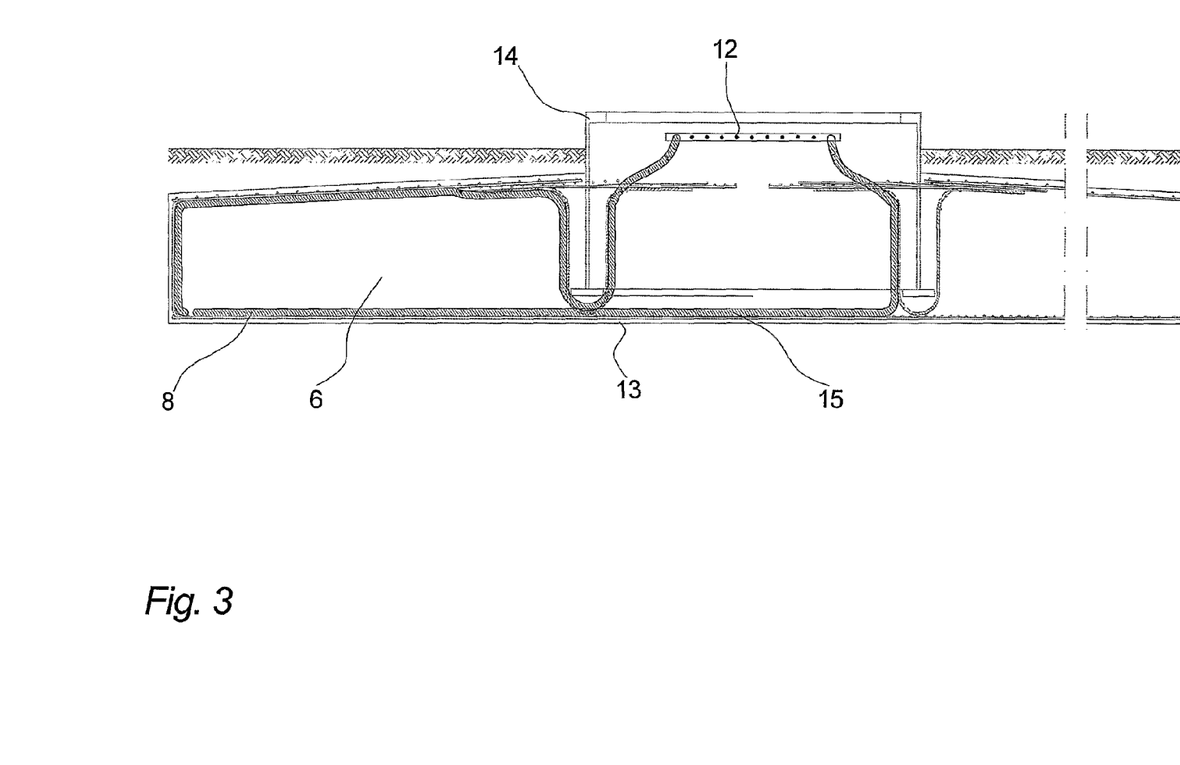
FIG. 3 illustrates a cross section of an internal earthing system in a wind turbine foundation, as seen from the front.

FIG. 3 illustrates a cross section of an internal earthing system 8 in a wind turbine foundation 6, as seen from the front.

In this embodiment a number of 50 mm$^2$ stranded copper wires 15 embedded in the steel reinforced concrete foundation 6 are connected by connection terminals, for secure connections between the copper earthing wire 15 and the crossing reinforcement steel bars e.g. at each 5 meters along the earthing wire. On top of that the copper earthing wire 15 is connected to all crossing reinforcement steel bars by normal steel wire bindings.

The present invention relates to all kinds of wind turbines 1 connected to and producing power to a utility grid and therefore also to all kinds of wind turbine towers 2 such as tubular steel towers 2, concrete towers, lattice towers and other. Different types of towers 2 could demand different types of foundation 6, and even for the most common type of wind turbine tower 2, namely the tubular steel tower 2 several different types of foundations 6 exists.

One type is to cast a number of threaded pins (not shown) into the foundation 6 and then connect the tower 2 to the foundation by means of these pins. Another type of foundation is in principle to cast the bottom part 14 of the tower in form of a steel foundation section 14 into the foundation 6 during the making of the foundation 6 as shown in FIG. 3.

When making this type of wind turbine foundation 6 the first thing to do is to dig a large hole in the ground and install the bottom reinforcement layer 13 and the foundation section 14. Then the work on the foundation earthing 8 must start by unrolling in this case 90 meters of earthing wire 15 beside the foundation 6.

The wire 15 is then pulled trough the top of the foundation section 14, down trough the bottom, and out to the outer edge of the reinforcement. Then all along the edge of the entire foundation 6 and back to where the wire 15 started, along the edge. Then back to the foundation section 14, but going back to the foundation section 14, leaving enough slack so the earthing wire 15 later can be fixed to the upper layer for reinforcement steel. The earthing wire 15 is then pulled the rest of the way, back down under the foundation section 14 up to the main earth bonding bar 12 where it started.

Both ends of the earthing wire 15 are mounted (cable locks) to the main earth bonding bar 12, close to each end of the bonding bar 12.

Connection terminals are then placed e.g. every 5 meters along the earthing wire 15 to connect the earthing wire 15 to the bottom steel reinforcement 13.

After this the upper layer of reinforcement can be installed whereto further connection can be installed.

As soon as the foundation earthing wires 15 has been connected to the main earth bonding bar 12, and the foundation section 14 has been concreted, the foundation earthing can be used as a temporary earthing during turbine erection, by connecting to the main earth bonding bar 12.

This goes for any part of the wind turbine 1; blade 5, rotor 4, nacelle 3 and tower sections 2 etc. to avoid static discharge while handling the parts of the wind turbine 1, during erection or when a portable generator set requires an earthing.

Figure 4:
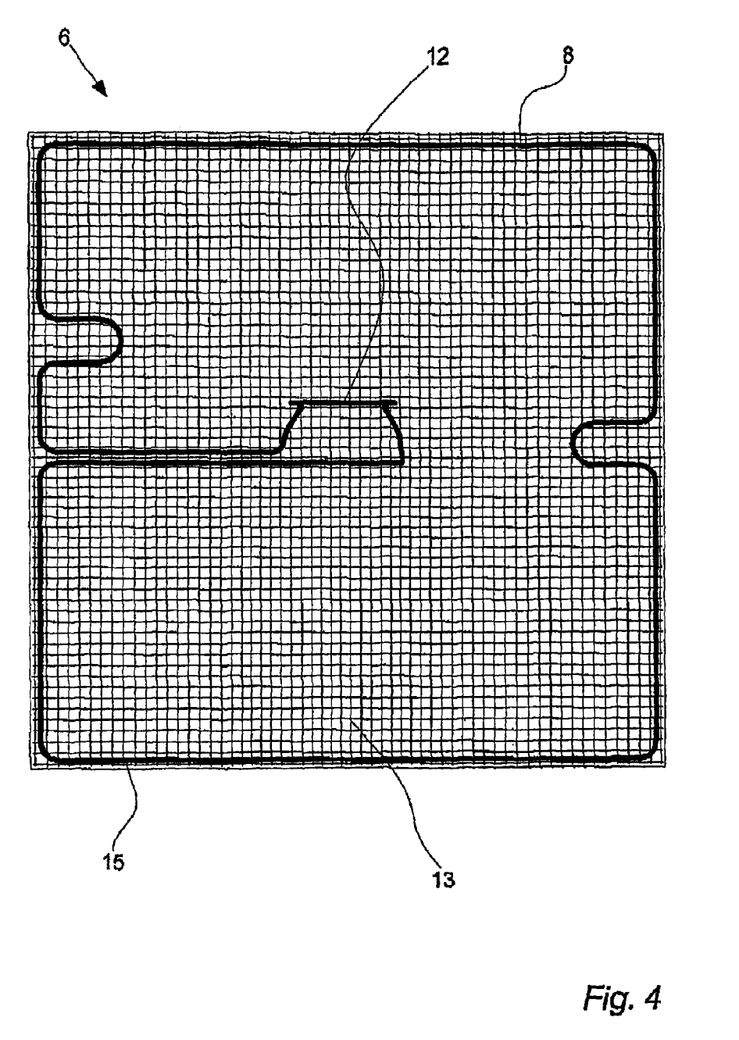
FIG. 4 illustrates a cross section of the same internal earthing system in a wind turbine foundation as shown in FIG. 3, as seen from the top.

FIG. 4 illustrates a cross section of the same internal earthing system in a wind turbine foundation 6 as shown in FIG. 3, as seen from the top.

The figure illustrates one internal earthing wire 15 running along more or less the entire perimeter of the foundation 6. One end of the wire 15 is connected to one end of the rail 12 and the other end of the wire 15 is connected to the other end of the rail 12.

Figure 5:
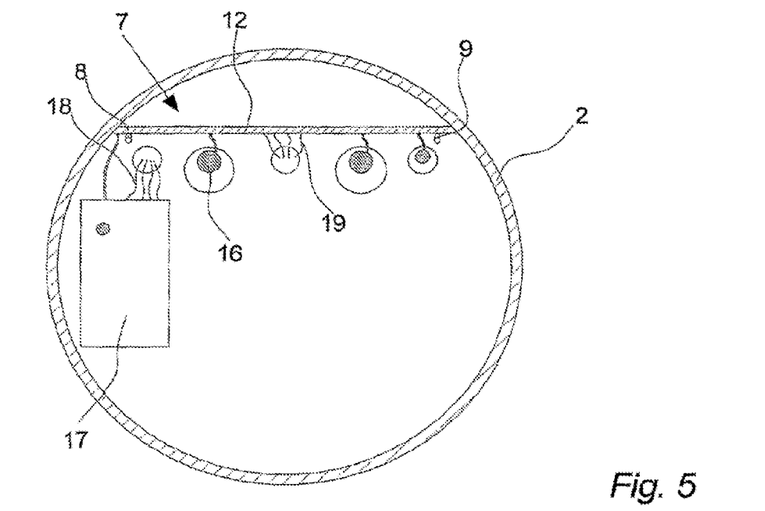
FIG. 5 illustrates a cross section a wind turbine tower comprising a first embodiment of a rail, as seen from the top.

FIG. 5 illustrates a cross section a wind turbine tower 2 comprising a first embodiment of a rail 12, as seen from the top.

In this embodiment of the invention the rail 12 is welded directly to the inside surface of the foundation section 14, but in another embodiment the rail 12 could also be bolted to the foundation section 14 or if the foundation does not comprise a foundation section 14, the rail 12 could be mounted on the bottom of the tower 2 immediately above the foundation 6. No matter the design or type of the tower 2 or the foundation 6 it is an object of the invention to establish a connection between all power and/or signal conducting cables 16, 18, 19 to an electrically earth potential in form of the rail 12 in one defined place within the wind turbine 1.

Protective measures against injuries of living beings due to touch voltage are reduced to a tolerable level by the design of the down conductor of the wind turbine 1. In this embodiment the down conductor of the lightning protection system is defined as the entire tower construction (a natural down conductor), practically one large extensive metal framework.

Protective measures against injuries of living beings due to step voltage are reduced to a tolerable level by equipotentialisation of constructions and surrounding soil, by the means of the meshed earthing system 7. In this design the entire foundation earthing (all steel bars or nets in the foundation) in connection with radial extending electric conducting means 9 which further can function as earth interconnection wires 11 between the a number of wind turbines 1 in a wind turbine park 10.

As all metal parts in and within reach of the wind turbine 1 are interconnected and connected to the meshed earthing system 7 directly beneath the tower 2, so no matter how large a current running in the earthing system 7, all parts and surrounding soil will be lifted to the same potential. When all metal parts and surrounding soil are leveled at the same potential (voltage), no unacceptable touch or step voltage will occur.

In this embodiment all cable screens or concentric earth wire in all high voltage cables 16 entering the tower 2 will be connected to the rail 12 in form of a main earth bonding bar 12, directly when entering the tower 2. This could be done by stripping a part of the high voltage cable 16 to lay open the screen. The screen could then by means of copper springs, nets and/or braids be connected to the rail 12 by forming a loop from the screen to the rail 12.

Fibre optic cables 19 with metallic cable screens will also be connected directly to the main earth bonding bar 12, directly at the entering point.

All conventional copper signal-, control—or communication cables 18 will be entered into the turbine 1 via overvoltage arresters placed in a termination box/equipotential box 17 installed near or directly on the main earth bonding bar 12.

This box 17 contains overvoltage arresters according to number and type of cables 18 planned to enter the turbine 1.

The number and the type of signal- or communication cables 18 entering each turbine 1 is always site specific, whereas the number and type of the overvoltage arresters also are specific for each turbine 1.

The cable screens of the signal-, control—or communication cables 18 will be connected to the earthing terminals in the equipotential box 17, on both incoming and outgoing cables 18.

Fibre optic cables without metallic cable screens (not shown), are allowed to enter the turbine 1 without connecting the cable to the main earth bonding bar 12.

Figure 6:
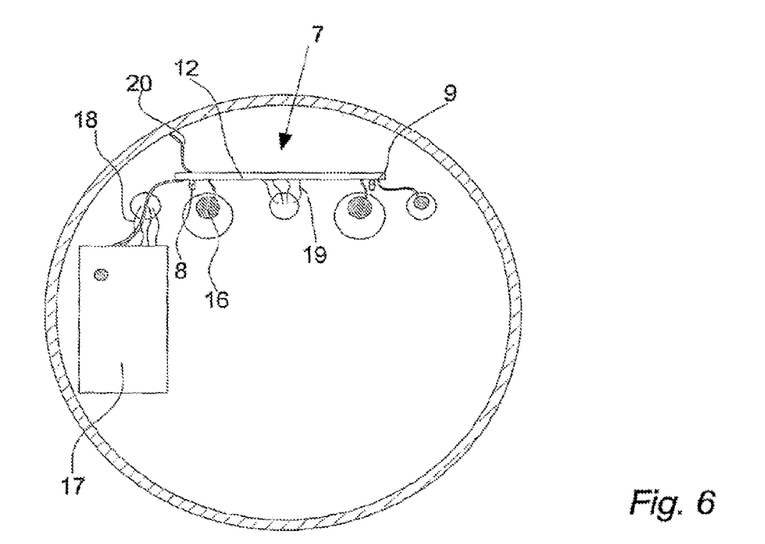
FIG. 6 illustrates a cross section a wind turbine tower comprising a second embodiment of a rail, as seen from the top.

FIG. 6 illustrates a cross section a wind turbine tower 2 comprising a second embodiment of a rail 12, as seen from the top.

In this embodiment of the invention the 12 all the power and/or signal conducting cables 16, 18, 19 and cables from all earthing systems 7, 8, 9, 11 are all connected in one defined area via the rail 12 at the bottom of the tower 2. The rail 12 is then further connected to the tower 2 by means of a earth cable 20 which thereby further establishes a direct or indirect current conducting connection between the earthing system 7 and all connected metal parts of the wind turbine 1.

Figure 7:
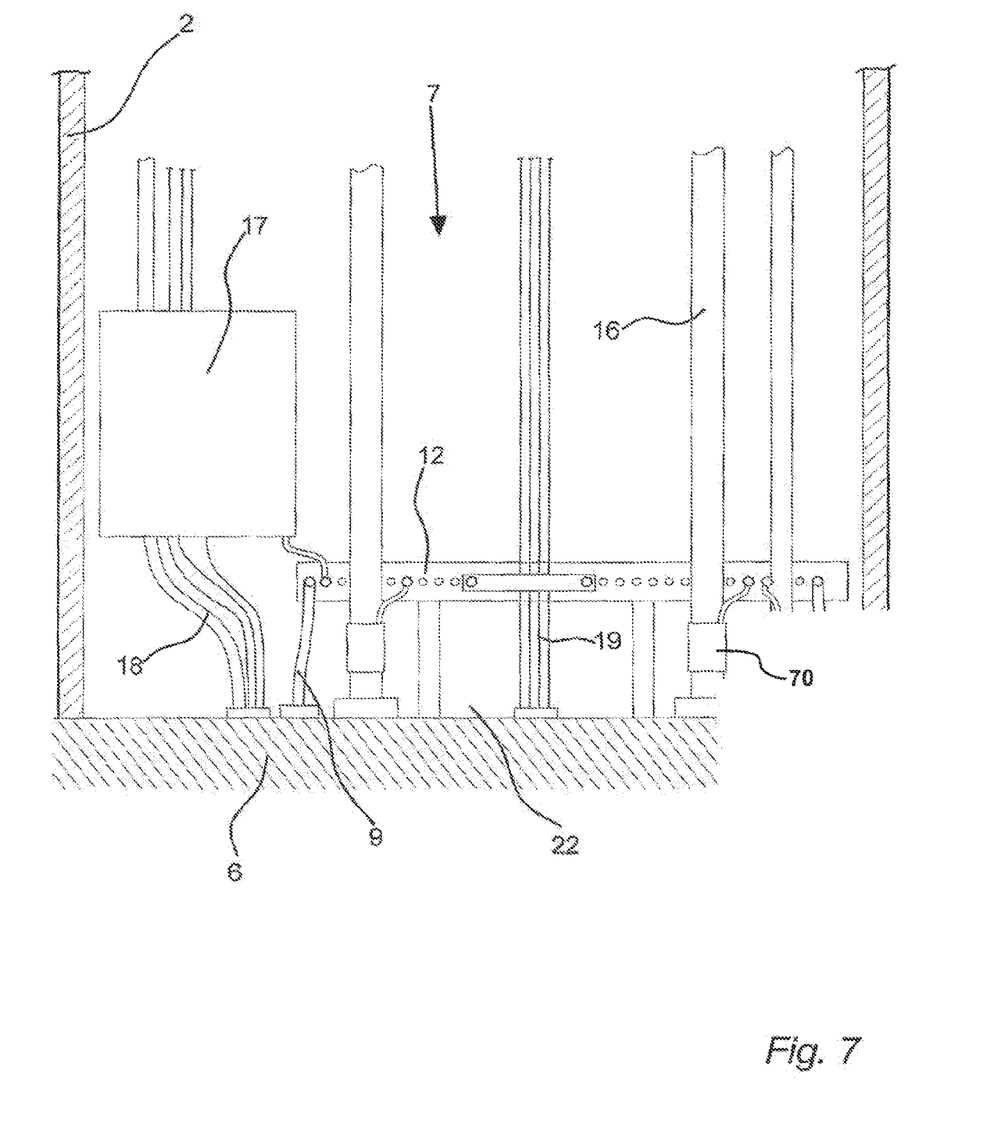
FIG. 7 illustrates a cross section a wind turbine tower comprising a rail, as seen from the front.

FIG. 7 illustrates a cross section a wind turbine tower 2 comprising a rail 12, as seen from the front.

In this embodiment all cables and wires are connected to the earthing system 7 at the single point of entry (SPE) 22 which in this case is the place just above the ground level at the bottom of the wind turbine tower 2 where all wires and cables enters or exits the wind turbine 1 through conduits in the foundation 6.

The power and/or signal conducting cables 16, 18, 19 and cables from all earthing systems 7, 8, 9, 11 can be connected to the rail in a number of different ways. A well known way is to provide the end of the cable with a cable lock 70 and then connect it to the rail 12 by means of a bolt through the hole in the cable lock.

In this embodiment the equipotential box 17 is placed beside the rail 12 but in another embodiment of the invention the box 17 would be placed directly on the rail 12.

The rail 12 is in this embodiment connected to an electric system in form of a low or high voltage power system (according to IEC a low voltage system is all systems bellow 1000 volts and high voltage systems are all systems above 1000 volts). The rail is further connected to a control system in form of a SCADA (Supervisory Control And Data Acquisition) system. The SCADA system is a large-scale, distributed measurement (and control) system often used in wind turbine parks 10, but also in relation with individually sited wind turbines 1.

Even further the rail 12 is connected to a safety system in form of a lightning protection system, which ensures that if a lightening strikes the wind turbine, the power is lead into the ground without damaging the wind turbine 1.

Figure 8:
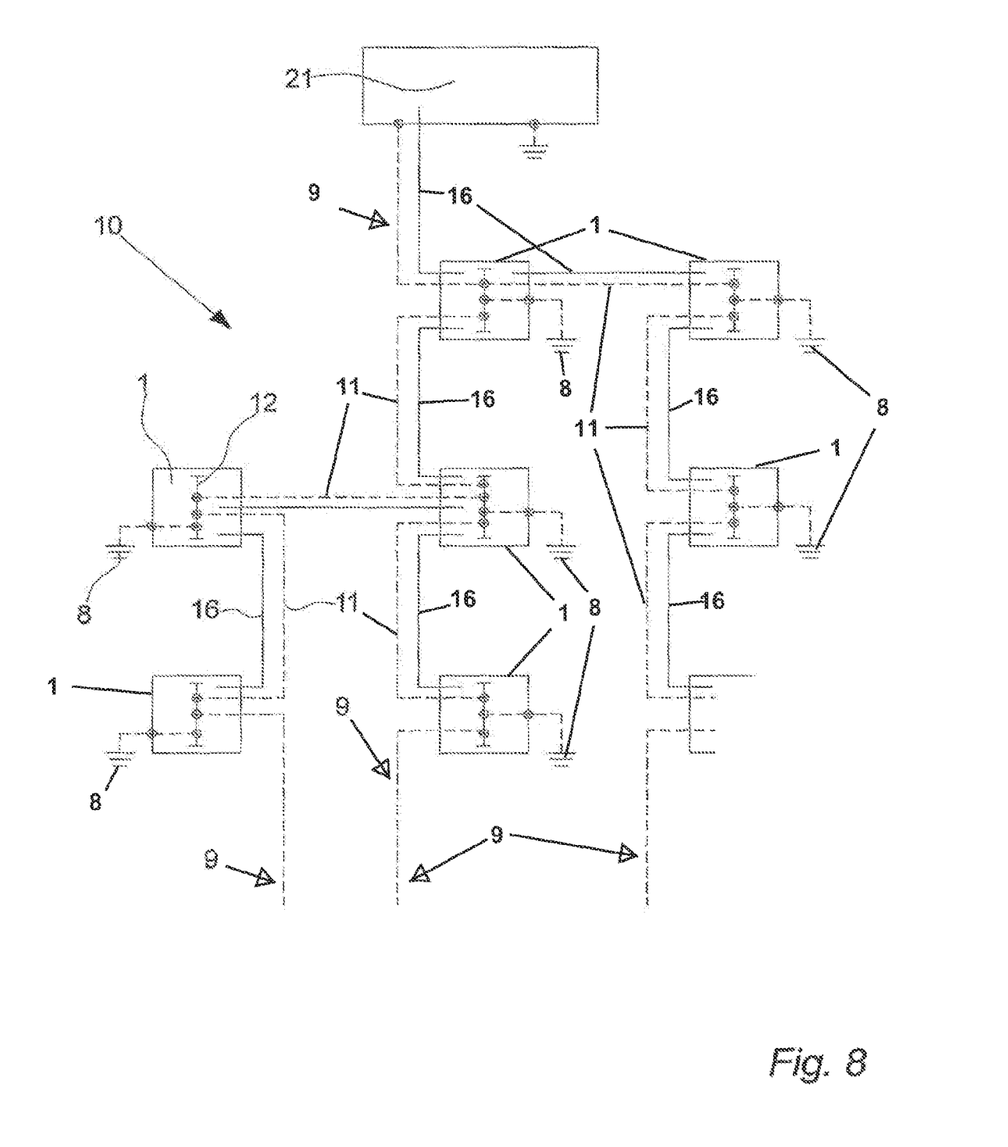
FIG. 8 illustrates a schematic view of the cabling in a wind turbine park, as seen from the top.

FIG. 8 illustrates a schematic view of the cabling in a wind turbine park 10, as seen from the top In this embodiment of the invention eight individual wind turbines 1 are connected to each other and a substation 21 by means of the electric conducting means 9 of the earthing system 7 in form of earth interconnection wires 11.

The substation 21 could comprise transformers, equipment to facilitate the host control functions of the SCADA system, accommodation, storage room and other facilities.

The earth interconnection wire 11 serves both as a part of the earthing system 7 but also as a part of a lightning protection of the high voltage cables 16 running between each wind turbine 1 and between wind turbines 1 and sub station 21.

At the bottom of each of the towers 2 a main earth bonding bar 12 is installed. All earthing connections 7, 8, 9, 11 are connected directly to this rail 12 in all the wind turbines 1. Additionally equipotential connections to all cables, or cable screens, are made immediately after the cables have entered the wind turbine 1.

Additionally each wind turbine 1 and substation 21 is connected by the concentric cable screen or earth wire which forms part of the high voltage cable 16 connecting the wind turbines 1 and sub station 21. Based on these double interconnections of all wind turbines 1 and sub station 21 in the same grid, the earthing system 7 are regarded as a multi-earthed HV (High Voltage) neutral conductor system.

Along each high voltage cable 16 connection between individual wind turbines 1 or between a wind turbine 1 and substation 21, a bare stranded cupper conductor 9 is installed which hereby forms an earth interconnection wire 11.

In a preferred embodiment the earth interconnection wire 11 is buried along with, but above the high voltage cables 16, to make the wires 11 act as lightening protection of the high voltage cables 16 through their entire path in the ground. But in some parts of the world there can be local rules or regulations dictating another placement of the earth interconnection wire 11 such as bellow or beside the high voltage cables 16.

Usually there are no signal cables or communication cables placed in the same cable trench as the high voltage cables 16 and earth interconnection wire 11. Only fibre optic cables without metallic cable screens can be places at the same cable trench as the high voltage cables 16 and earth interconnection wire 11.

If signal, control or communication cables 18, containing metallic wires, screens, armour, tapes etc. and high voltage cables 16 and earth interconnection wire 11 are placed to close in the ground, there is great risk of damaging the communication equipment and cables due to proximity to the high voltage cables 16 and earthing system 7. The damages are caused by the induced voltage in the communication cables 18 during an earth fault or short circuit in the high voltage system.

The communication cables 18 containing metallic wires, screens, armour, tapes etc. are preferably placed in separate cable trenches, a minimum of 1 away from the cable trench containing high voltage cables 16, when running in parallel direction. When communication cables 18 crosses a cable trench of a high voltage cable 16 and earth interconnection wire 11 the distance to the low voltage cable, in the cross point is preferably no less than 0.3 meters.

Figure 9:
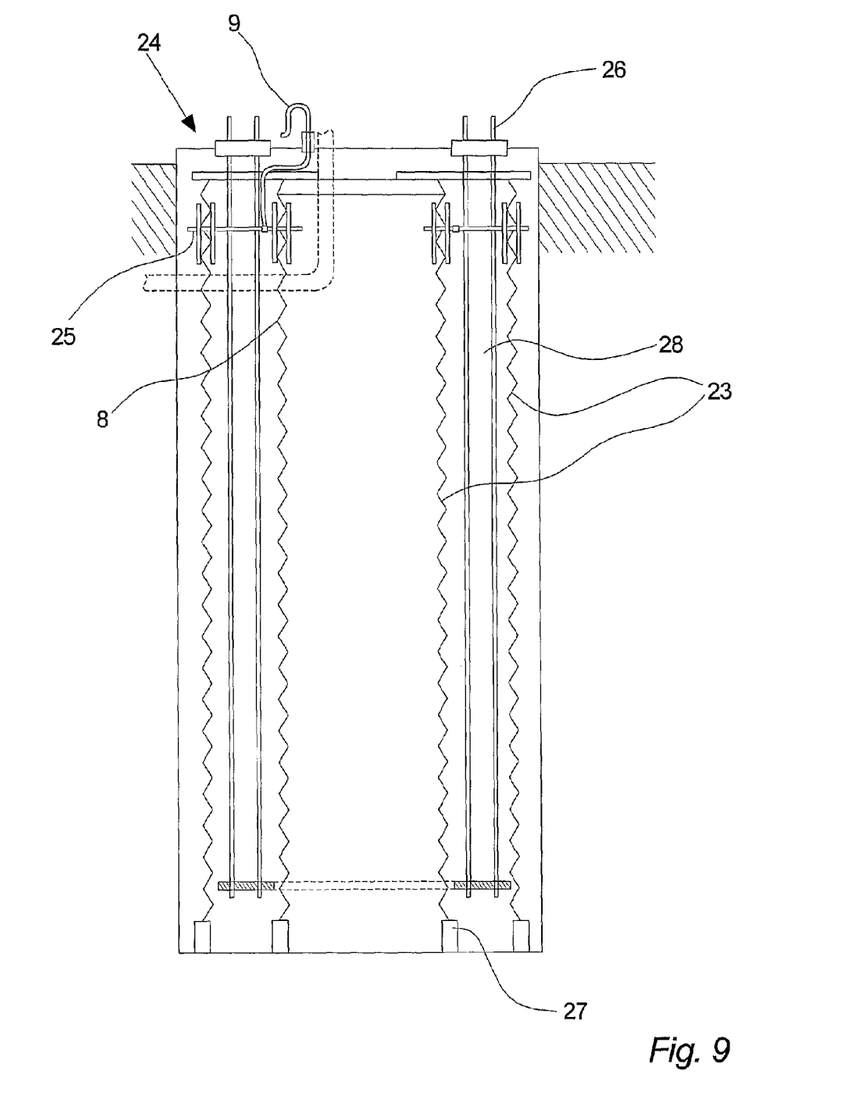
FIG. 9 illustrates a cross section of an embodiment of a pier foundation comprising an earthing system, as seen from the side.

FIG. 9 illustrates a cross section of an embodiment of a pier foundation 24 comprising an earthing system 7, as seen from the front.

In this embodiment of the invention the pier foundation 24 comprise two metal support structures 23 in the form of an inner and an outer corrugated pipe shell. The distance between the two structures 23 are maintained by means of a number of threaded rods 25 made from metal such as steel, hereby also forming an electrical connection between the two support structures 23.

A pier foundation 24 is a foundation type that is usually formed by digging a large hole in the ground and placing two concentric metal support structures 23 in the hole. Basically the space between the two structures is provided with a number of anchor bolts 26 where after the space is filled with concrete 28. The anchor bolts 26 are used for attaching the tower 2 to the foundation 6.

Electric conducting means 9 e.g. in the form of a bare stranded cupper wire is in this embodiment connected to one or more of the threaded bolts 25 and embedded through the concrete 28 and up above the upper surface of the foundation for connection to the rail 12.

The structures 23 could be galvanized but if they are galvanized, the Zink surface layer will work as a sacrificial anode for the electric conducting means 9. Therefore the Zink layer will disappear over a relatively short time. In this embodiment of the invention the entire outer side of the whole foundation 6 is therefore covered by concrete or slurry 28 (same characteristic) making the bare steel surface of the support structures 23 inactive, corrosion wise. In this embodiment the inside of the inner pipe shell of the foundation 24 is filled with concrete 28 but in another embodiment only an annular trench could be dug with an inner diameter smaller then the inner diameter of the inner pipe shell, leaving a cavity which could be filled with concrete 28, slurry or dirt.

To ensure that the entire support structures 23 is encapsulated by concrete or slurry 28 the structures 23 are placed on a number of spacers 27 e.g. formed as prefabricated concrete bricks, hereby allowing concrete or slurry 28 to flow in under the structures 23 during the making of the foundation 24.

Figure 10:
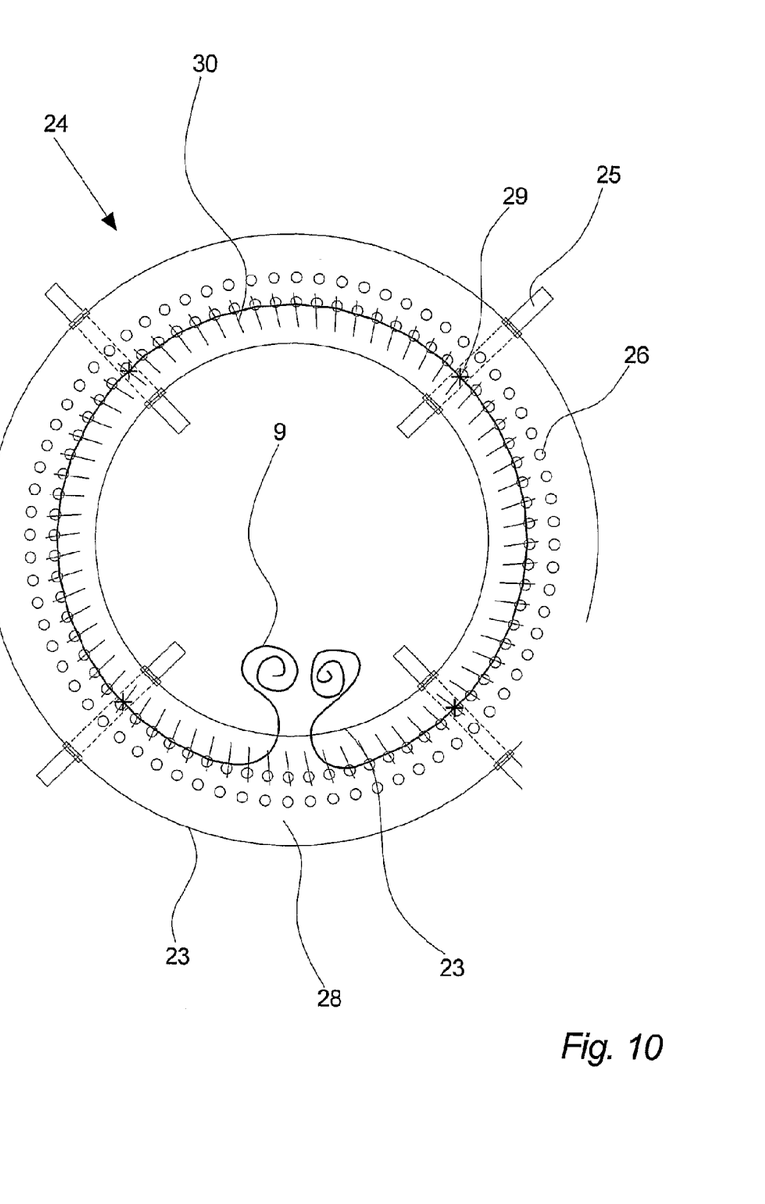
FIG. 10 illustrates an embodiment of a pier foundation comprising an earthing system, as seen from the top.

FIG. 10 illustrates an embodiment of a pier foundation 24 comprising an earthing system 7, as seen from the top.

In this embodiment of the invention the electric conducting means 9 are formed as one single wire partially embedded in the concrete 28 and connected to all four threaded rods near the top of the foundation 24 by means of connection terminals 29 or rebar clamps. The two free ends of the electric conducting means 9 are guided through the concrete 28 and up into the single point of entry 22 for connection to the rail 12.

In this embodiment of the invention the pier foundation 24 is further provided with annular metal reinforcement 30 between the two annular metal support structures 23.

In another embodiment of the invention the electric conducting means 9 could be connected directly to the metal support structures 23, to the annular reinforcement 30 or other or the electric conducting means 9 could be connected to another number of anchor bolts 26 such as one, two, three, six or more.

The invention has been exemplified above with reference to specific examples of earthing systems 7, towers 2, foundations 6 and rails 12. However, it should be understood that the invention is not limited to the particular examples described above but may be designed and altered in a multitude of varieties within the scope of the invention as specified in the claims.

LIST

1. Wind turbine
2. Tower
3. Nacelle
4. Rotor
5. Blade
6. Foundation
7. Earthing system
8. Foundation earthing
9. Electric conducting means
10. Wind turbine park
11. Earth interconnection wire
12. Rail
13. Bottom reinforcement layer
14. Foundation section
15. Earthing wire
16. High voltage cable
17. Equipotential box
18. Signal-, control- or communication cable
19. Fibre optic cable
20. Earth cable
21. Substation
22. Single point of entry (SPE)
23. Metal foundation support structure
24. Pier foundation
25. Threaded rod
26. Anchor bolt
27. Spacer
28. Concrete
29. Connection terminal
30. Annular reinforcement
D1. Depth of electric conducting means in the ground
D2. Extend of electric conducting means from the wind turbine

The invention claimed is:

1. A wind turbine connected to a utility grid, said wind turbine comprising:
   a tower;
   at least one electric system disposed within the tower;
   at least one control system disposed within the tower;
   at least one safety system disposed within the tower;
   a rail disposed within the tower; wherein the at least one electric system, the at least one control system and the at least one safety system are each electrically coupled to the rail, wherein the at least one electric system comprises a high voltage cable, wherein a cable lock surrounds the high voltage cable and wherein the cable lock is electrically coupled to the rail;
   at least two independent systems coupled to the rail and establishing earth potential, wherein a first system of the at least two independent systems follows a main power cable of the wind turbine to a substation.

2. The wind turbine according to claim 1, where said rail is positioned within a foundation section of the wind turbine.

3. The wind turbine according to claim 1, where said rail is positioned within a tubular tower ring with connections to the inside of the ring.

4. The wind turbine according to claim 1, where said rail is positioned within a lattice tower with connections to different steel profiles of the tower.

5. The wind turbine according to claim 1, wherein portions of said systems coupled to the rail are screens of the power cables, screens of the control cables, down conductor of lightning protection systems and/or screen of fibre optic cables.

6. The wind turbine according to claim 1, where said rail comprises an electrically conductive material.

7. The wind turbine according to claim 6, where said rail material is stainless steel.

8. A wind turbine park comprising at least two wind turbines according to claim 1.

9. The wind turbine park according to claim 8, wherein said at least two wind turbines are interconnected by means of at least two independent systems of said wind turbines.

10. The wind turbine park according to claim 9, wherein said two independent systems comprise one or more electric conducting means extending radial from said wind turbines into the ground, said electric conducting means being interconnected hereby forming one or more earth interconnection wires.

11. The wind turbine according to claim 1, wherein the at least one electric system comprises at least two electric systems and further comprising a wind turbine foundation having at least one earthing wire embedded partly or totally in the wind turbine foundation; and at least one electric conducting means extending radial from said wind turbine into the ground.

12. The wind turbine according to claim 11, where said rail comprises an electrically conductive material with connection means for said systems for establishing connection between the rail and cable screens of said systems.

13. The wind turbine according to claim 12, where said rail material is stainless steel.

14. The wind turbine according to claim 11, where the at least two independent systems are embedded partly or totally in the wind turbine foundation.

15. The wind turbine according to claim 14, where said at least two independent systems comprises two electric conducting means extending radial from said wind turbine into the ground in a mutual angle of no less than 80 degrees in a horizontal plane.

16. The wind turbine according to claim 14, where said at least two independent systems comprises one or more electric conducting means extending radial from said wind turbine into the ground.

17. The wind turbine according to claim 16, where one end of at least one of said electric conducting means are connected to the earthing system of a substation, the earthing system of a neighbouring wind turbine, the earthing system of a transformation plant of a utility grid or the earthing system of a high-voltage cable of a utility grid.

18. The wind turbine according to claim 1, where the at least two independent systems are embedded partly or totally in the wind turbine foundation.

19. The wind turbine according to claim 18, where said at least two independent systems comprises two electric conducting means extending radial from said wind turbine into the ground in a mutual angle of no less than 80 degrees in a horizontal plane.

20. The wind turbine according to claim 18, where said at least two independent systems comprises one or more metal foundation support structures enclosing said wind turbine foundations and/or embedded in the wind turbine foundation.

21. The wind turbine according to claim 18, where said at least two independent systems comprises one or more electric conducting means extending radial from said wind turbine into the ground.

22. The wind turbine according to claim 21, where one end of at least one of said electric conducting means are connected to the earthing system of the substation, the earthing system of a neighbouring wind turbine, the earthing system of a transformation plant of a utility grid or the earthing system of a high-voltage cable of a utility grid.

23. The wind turbine according to claim 18, where said at least two independent systems comprises a foundation earthing including at least one earthing wire embedded in said foundation.

24. The wind turbine according to claim 23, where said at least one earthing wire comprises means for electrical connection to metal reinforcement in said foundation.

25. The wind turbine according to claim 23, where said electric conducting means and/or said earthing wire are bare stranded copper wires.

* * * * *

UNITED STATES PATENT AND TRADEMARK OFFICE
CERTIFICATE OF CORRECTION

PATENT NO. : 8,383,933 B2
APPLICATION NO. : 12/302247
DATED : February 26, 2013
INVENTOR(S) : Mogensen et al.

Page 1 of 1

It is certified that error appears in the above-identified patent and that said Letters Patent is hereby corrected as shown below:

In the Specification:

In the Description of the Related Art:

Column 1, Line 18, please delete "lightening" and insert -- lightning -- therefor;

In the Invention:

Column 1, Line 53, please delete "lightening" and insert -- lightning -- therefor;
Column 2, Line 22, please delete "lightening" and insert -- lightning -- therefor;
Column 3, Line 23, please delete "lightening" and insert -- lightning -- therefor;
Column 3, Line 26, please delete "lightening" and insert -- lightning -- therefor;

In Detailed Description:

Column 6, Line 23, please delete "lightening" and insert -- lightning -- therefor;
Column 6, Line 59, please delete "lightening" and insert -- lightning -- therefor;
Column 7, Line 47, please delete "trough" and insert -- through -- therefor;
Column 7, Line 48, please delete "trough" and insert -- through -- therefor;
Column 9, Line 55, please delete "lightening" and insert -- lightning -- therefor;
Column 10, Line 23, please delete "lightening" and insert -- lightning -- therefor.

Signed and Sealed this
Twenty-second Day of October, 2013

Teresa Stanek Rea
*Deputy Director of the United States Patent and Trademark Office*